April 23, 1935. J. L. BENNETT 1,999,002
BROILER AND TOASTER
Filed Feb. 21, 1934
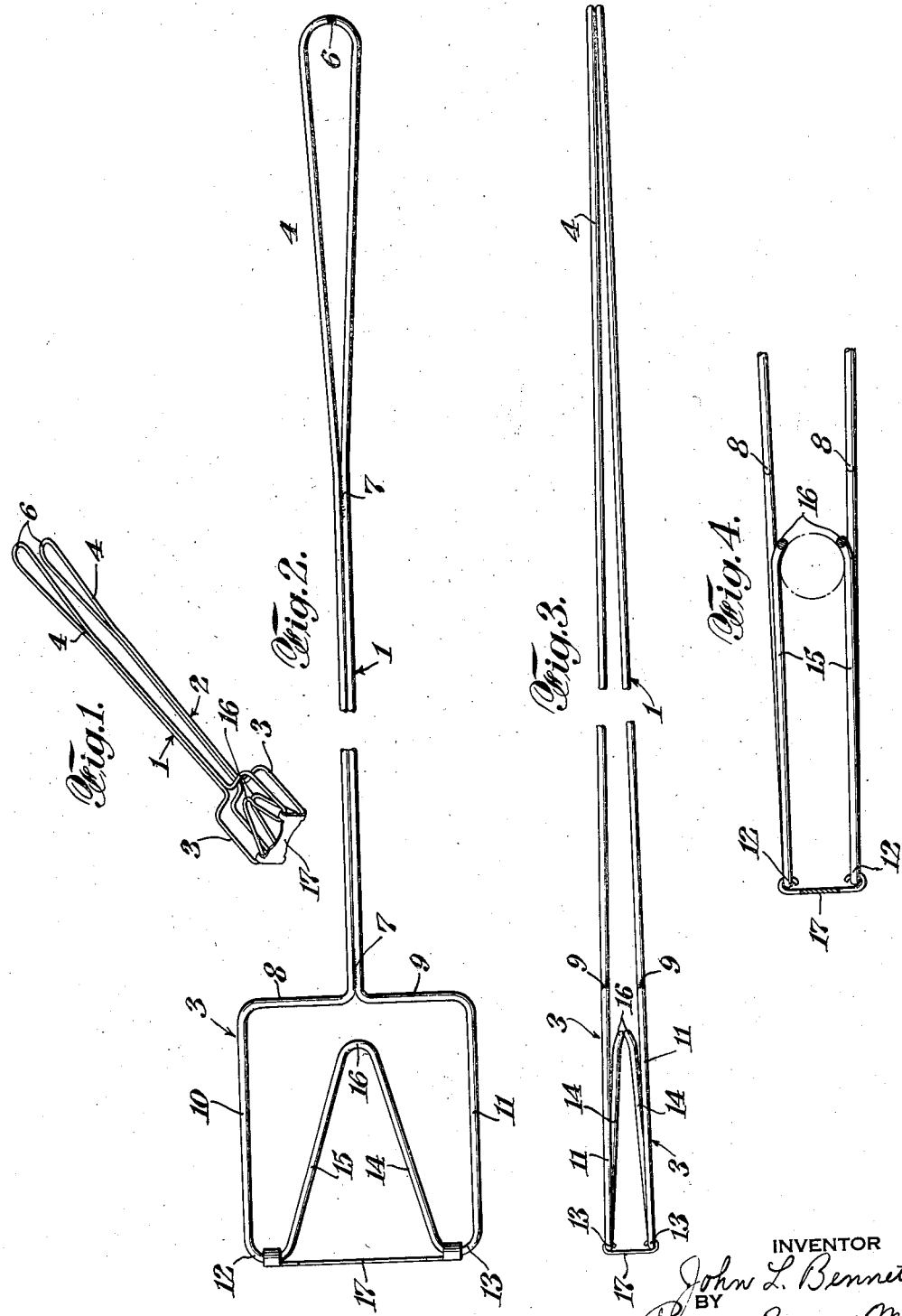
INVENTOR
John L. Bennett
BY
Prindle, Bean & Mann
ATTORNEYS Patented Apr. 23, 1935

1,999,002

UNITED STATES PATENT OFFICE 1,999,002

BROILER AND TOASTER

John L. Bennett, Decatur, Ill., assignor to U. S. Manufacturing Corporation, Decatur, Ill., a corporation of Illinois Application February 21, 1934, Serial No. 712,333

9 Claims. (Cl. 53—5)

This invention relates to improvements in a utensil adapted particularly for cooking purposes. The primary purpose is to provide a broiler or grill construction which is adapted for use in broiling small articles of food, toasting, grilling and the like.

The principal object of this invention is the provision of such a device which is simple in construction, easy to operate and clean and cheap to manufacture on a production basis, being composed of few parts readily made and assembled.

To the accomplishment of the foregoing and such other objects as may hereinafter appear, this invention consists in the construction, combination and arrangement of parts hereinafter described then sought to be defined in the appended claims, reference being had to the accompanying drawing forming a part hereof and which shows, merely for the purpose of illustrative disclosure, a preferred embodiment of my invention, it being expressely understood, however, that various changes may be made in practice within the scope of the claims without digressing from my inventive idea.

In the drawing—

Figure 1 is a perspective view of one form of device constructed to embody my invention;

Figure 2 is a plan view of the same;

Figure 3 is a side elevation of the same in completely closed condition.

Figure 4 is a longitudinal cross section of the same showing the article held between the two body parts.

Referring now to the drawing, the utensil is composed essentially of two members, 1 and 2 which are substantially duplicates and are composed of wire or other suitable material. Each part includes the body portion 3, an extended handle portion 4 and a gripping member or loop 16. Each member is preferably composed of a single piece of wire preferably bent in the form shown with the ends terminating at the bottom of the loop and welded, soldered or otherwise secured as at 6. The extended handle portion 4 is composed of two parallel strands of wire arranged close to each other and welded or soldered or otherwise secured at intervals as at 7.

The body portion 3 is preferably of general rectangular form and starting with the outer end of the handle portion includes the lateral extending portions 8 and 9, the parallel side portions 10 and 11, the loops 12 and 13 leading to the inclined or converging parts 14 and 15 terminating in a closed loop 16. In the formation of the converging parts 14 and 15 and the loop 16 the wire is depressed so that the loop as a whole extends inwardly with respect to the normal plane of the body portion as a whole, as defined by the laterally extending members 8 and 9 and the side members 10 and 11. In addition, the extreme inner end of the loop 16 is bent downwardly or inwardly so that when the body members are assembled in opposed relationship, that is in closed position, the extremities of the loops 16 may contact with each other.

The loops 12 and 13 form pintle members for a loose hinge construction, one form of which is illustrated and includes a plate 17 having a pair of opposed lugs 13 provided at each end, these lugs being bent in the form of eyes to receive the pintles provided by the ends of the loops 12 and 13. This plate member 17 is of sufficient width to space the two body parts of the utensil apart a sufficient distance so as to receive and hold any article of food that is to be held in the utensil and cooked. The arrangement of the inwardly extending loop insures that the food will be held in the utensil until the handle members are permitted to separate, the downward bending of the loops 16 causing a definite engagement with the article of food.

It is therefore seen that I have provided a simple and effective utensil for this purpose which is composed of two major parts and a loose hinge construction between them. This utensil has numerous uses connected with the cooking of foods. Various means may be provided for holding the handles in closed or locked relationship but these form no part of the present invention.

What I claim is:

1. A cooking utensil including a pair of body members held in opposed relation by a loose hinge construction each body member being composed of wire and having an inwardly projecting portion forming a loop which is bent or deflected inwardly so that the opposed curved deflected portions of said members will engage and hold articles of food therebetween.

2. A cooking utensil including a pair of body members held in opposed relation by a loose hinge construction, each body portion being composed of a single piece of wire bent to form lateral extensions and then parallel side pieces with the outer end portion bent inwardly near the side pieces to provide an inwardly extending holding member in the form of an open loop.

3. A cooking utensil including a pair of body members held in opposed relation by a loose hinge construction, each body portion being composed of a single piece of wire bent to form lateral extensions and then parallel side pieces and then to form portions converging toward said lateral extensions to provide an inwardly extending holding member in the form of an open loop, said open loop being bent or deflected inwardly.

4. A utensil of the character described, including a pair of body portions, a loose hinge construction for holding said body portions in opposed relation, each body portion being provided with a plurality of bends and said loose hinge construction being in the form of a plate having eyes provided at each end adapted to engage the body portions at said bends.

5. A utensil of the character described, including a pair of body portions, a loose hinge construction for holding said body portions in opposed relation, each body portion being provided with a plurality of bends and said loose hinge construction being in the form of a plate having eyes provided at each end adapted to engage said plurality of bends, each body portion also being provided with means adapted to engage and hold articles of food placed between the body portions.

6. A utensil of the character described, including a pair of body portions, a loose hinge construction for holding said body portions in opposed relation, each body portion being provided with a plurality of bends and said loose hinge construction being in the form of a plate having eyes provided at each end adapted to engage said plurality of bends, each body portion also being provided with means adapted to engage and hold articles of food placed between the body portions, said means including an open loop bent inwardly with respect to the body portion.

7. A device of the character described, including in combination two members, said members being substantially duplicates and each being composed of a single piece of wire bent to provide an extended handle portion with a gripping means on one end, and bent at the other end of the handle portion to form a rectangular body portion provided with an inwardly extended holding member in the form of an open loop and means for hinging said body portions together.

8. A device of the character described, including in combination two members, said members being substantially duplicates and each being composed of a single piece of wire bent to provide an extended handle portion with a gripping means on one end, and bent at the other end of the handle portion to form a rectangular body portion provided with an inwardly extended holding member in the form of an open loop, said loop being bent downwardly and means for hinging said body portions together.

9. A cooking utensil including a pair of body members held in opposed relation by a loose hinge construction, each body member being composed of wire and having an inwardly projecting portion forming a loop which is bent or deflected inwardly so that the opposed deflected portions of said members will engage and hold articles of food therebetween, said opposed loops being additionally bent towards each other at their extremities.

JOHN L. BENNETT.

CERTIFICATE OF CORRECTION.

Patent No. 1,999,002.  April 23, 1935.

JOHN L. BENNETT.

It is hereby certified that error appears in the printed specification of the above numbered patent requiring correction as follows: Page 1, second column, line 42, claim 1, strike out the word "curved"; and that the said Letters Patent should be read with this correction therein that the same may conform to the record of the case in the Patent Office.

Signed and sealed this 11th day of June, A. D. 1935.

(Seal)

Leslie Frazer
Acting Commissioner of Patents.